Oct. 23, 1923.
W. H. DE VANEY
1,471,651
MOLDING MACHINE
Filed Jan. 10. 1921    4 Sheets-Sheet 1
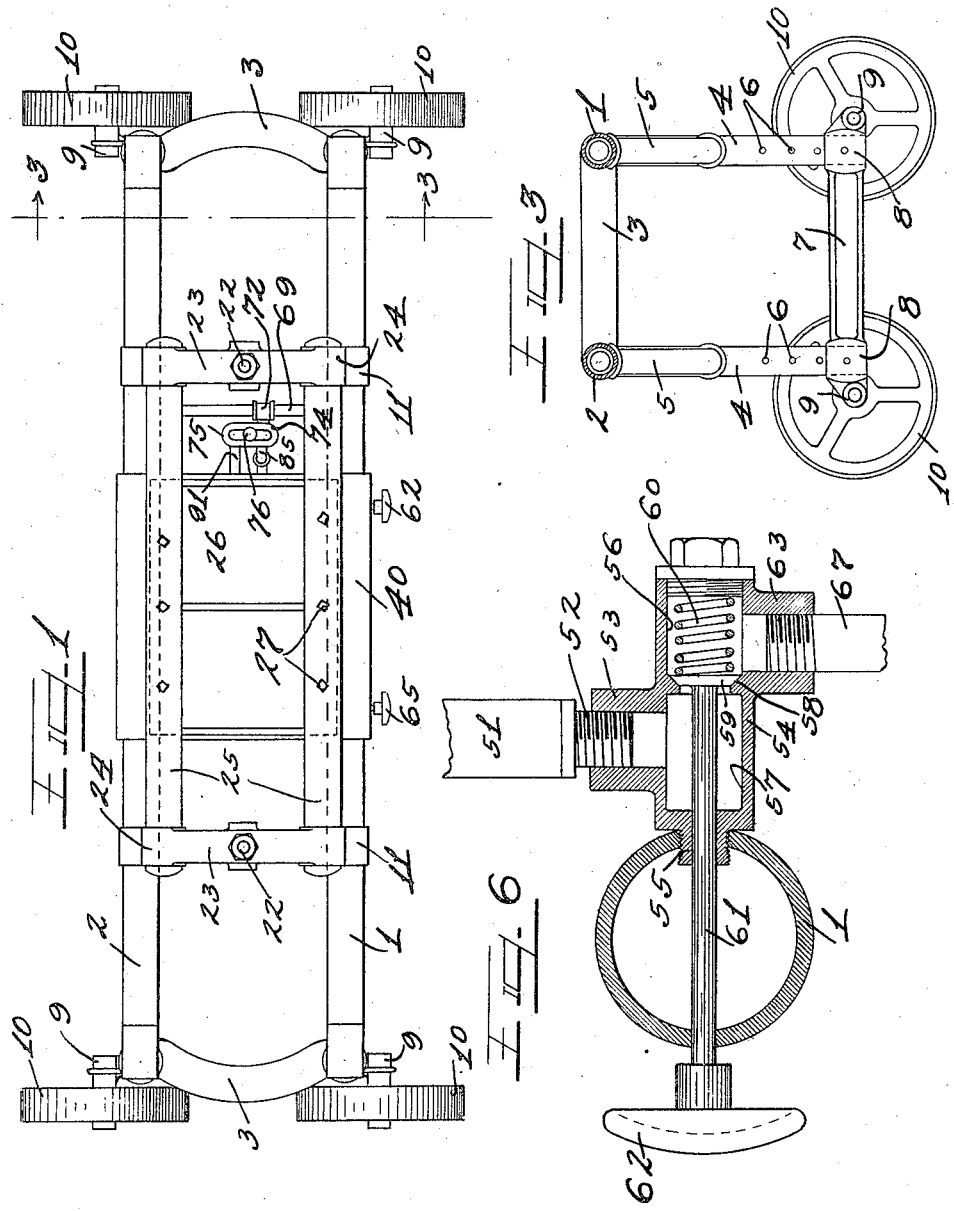

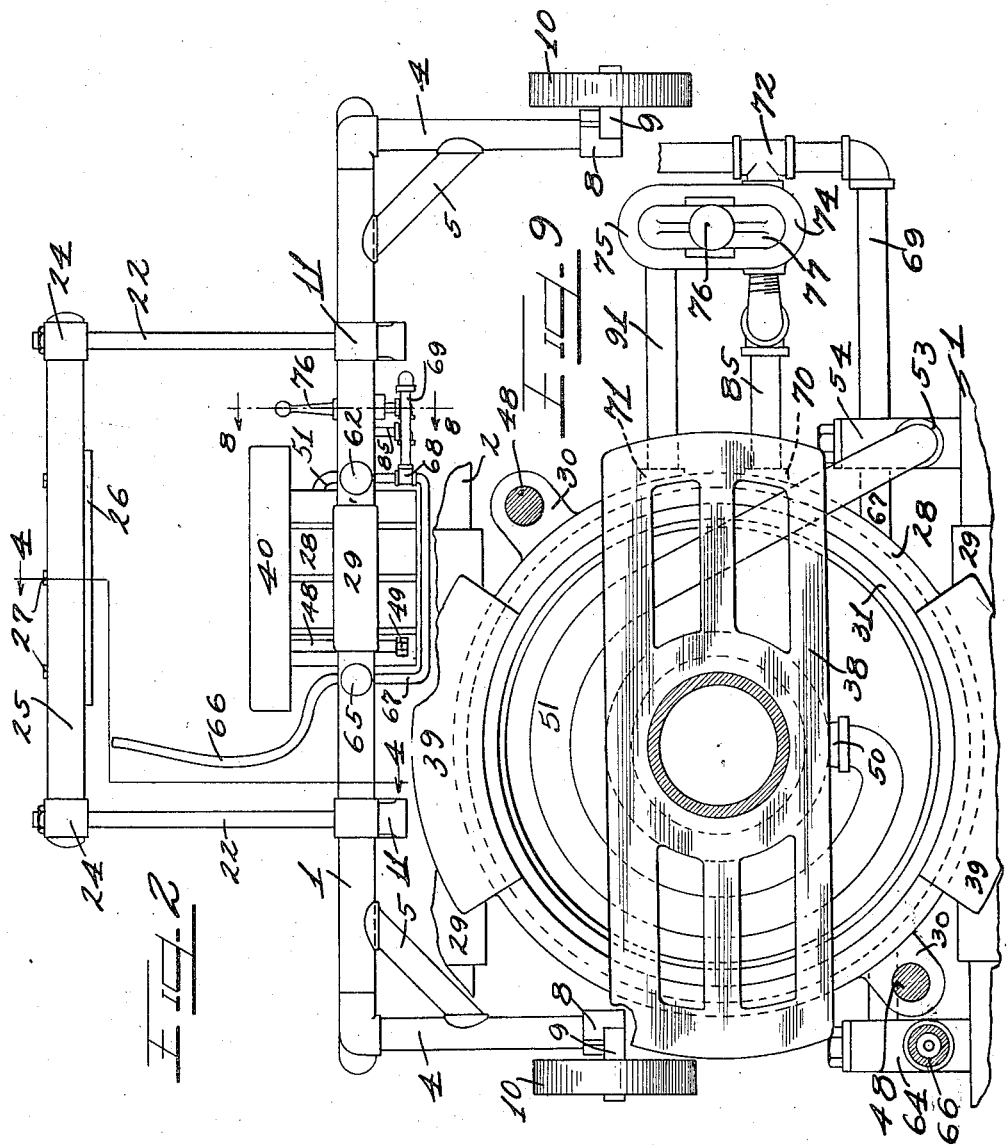

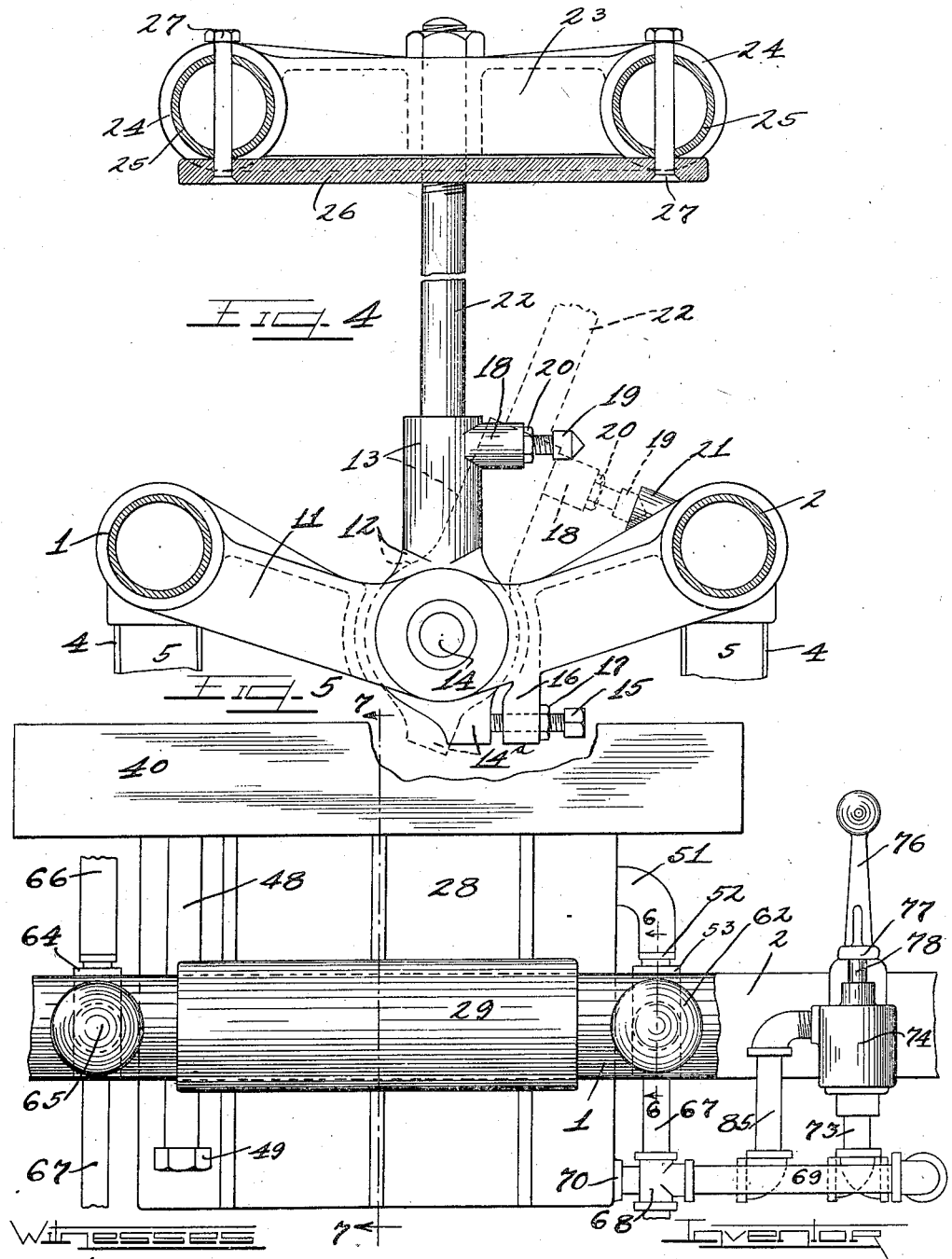

Oct. 23, 1923.
W. H. DE VANEY
1,471,651
MOLDING MACHINE
Filed Jan. 10, 1921 4 Sheets-Sheet 4
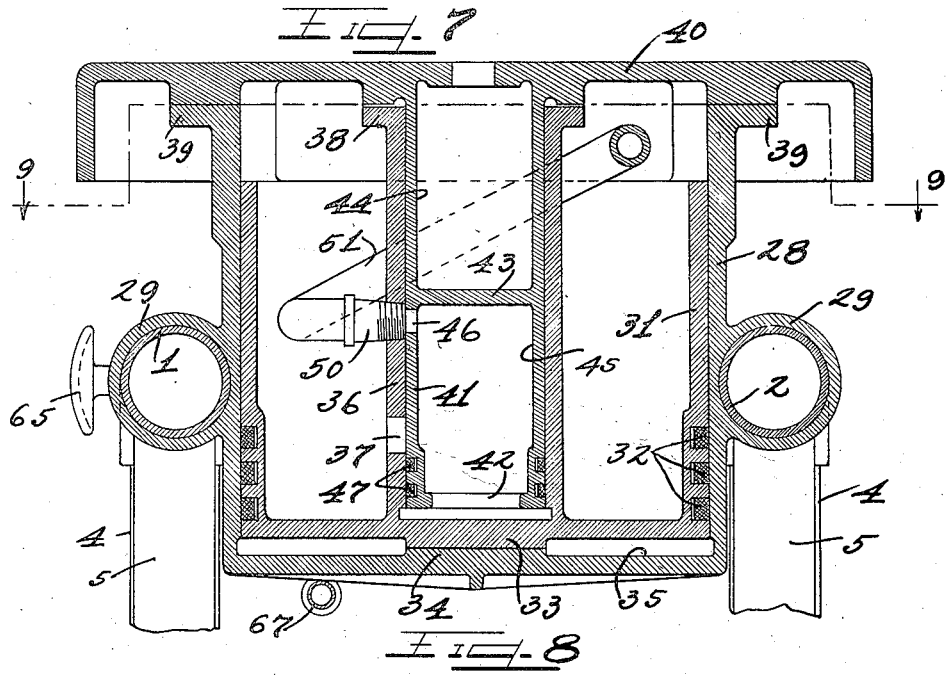
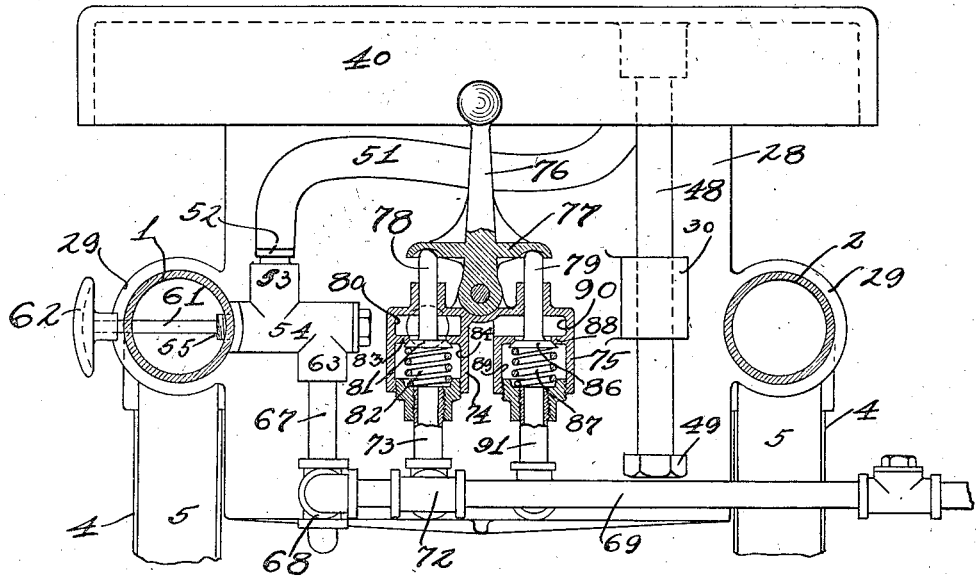

Patented Oct. 23, 1923.

1,471,651

UNITED STATES PATENT OFFICE.

WILLIAM H. DE VANEY, OF TOLEDO, OHIO.

MOLDING MACHINE.

Application filed January 10, 1921. Serial No. 436,023.

*To all whom it may concern:*

Be it known that I, WILLIAM H. DE VANEY, a citizen of the United States, and a resident of the city of Toledo, in the county of Lucas and State of Ohio, have invented certain new and useful Improvements in a Molding Machine; and I do hereby declare that the following is a full, clear, and exact description of the same, reference being had to the accompanying drawings, and to the numerals of reference marked thereon, which form a part of this specification.

This invention relates more particularly to an improved type of a molding machine wherein a portable machine frame is adapted to straddle a sand heap and supports aluminum squeezer and jolt members which are actuable by air the flow of which is controlled by suitable manually operable valve mechanisms.

It is an object of this invention to provide an adjustable molding machine adapted to straddle and be moved over a sand heap.

It is also an object of the invention to construct an air operated mould forming machine adjustable in height and adapted to be moved over a sand pile to facilitate filling of the mould flasks.

Another object of the invention is to provide a portable molding machine wherein the jolt piston and the squeezer piston are made of aluminum to obviate rusting thereby eliminating the troubles encountered when cast iron parts are used.

It is a further object of the invention to provide a molding machine wherein the jolter and squeezing mechanisms are mounted upon an adjustable framework which is supported by roller members to permit movement of the machine over a sand heap.

It is furthermore an object of this invention to provide a molding machine having a squeeze cylinder, a squeeze piston and a jolt piston slidably interfitting one another and supported on a portable frame to co-act with an adjustable head plate for the purpose of compressing sand within flasks positioned on the jolter table secured on the upper end of the jolt piston.

A further object of the invention is the construction of a portable molding machine wherein a plurality of air valves are provided for the purpose of controlling the operation of a squeeze piston and a jolter table upon which the mould flasks are supported for co-action with a head plate.

It is an important object of this invention to provide a portable molding machine of adjustable height adapted to straddle a sand pile to facilitate the forming of moulds by valve controlled squeezer and jolter mechanisms.

Other and further important objects of this invention will be apparent from the disclosures in the specification and drawings.

The invention (in a preferred form) is illustrated in the drawings and hereinafter more fully described.

On the drawings:

Figure 1 is a top plan view of a molding machine embodying the principles of this invention.

Figure 2 is a front elevation thereof.

Figure 3 is a sectional view taken on line 3—3 of Figure 1.

Figure 4 is an enlarged sectional view taken on line 4—4 of Figure 2.

Figure 5 is an enlarged front elevation of the jolter mechanisms and the valves controlling the operation thereof.

Figure 6 is an enlarged fragmentary detail section taken on line 6—6 of Figure 5 showing parts in elevation.

Figure 7 is a section taken on line 7—7 of Figure 5.

Figure 8 is an enlarged sectional view taken on line 8—8 of Figure 2.

Figure 9 is a horizontal section taken on line 9—9 of Figure 7.

As shown on the drawings:

The molding machine comprises a supporting frame embracing front and rear pipe sills 1 and 2 respectively connected to one another at their ends by end members 3. Supporting the sills and end members are four pipe legs or uprights 4 braced by pipe braces 5. The lower portions of the uprights 4 are provided with a series of apertures 6. Each end of the machine frame is provided with a transverse bar or axle 7 having apertured tubular heads or collars 8 formed on both ends thereof for slidable engagement on the uprights 4 as shown in Figure 3. Pins are adapted to be removably inserted through the apertures in the collars 8 and through apertures 6 of the uprights 4 registering with the collar apertures to hold the axle in an adjusted position. Integrally formed on each of the axle collars 8 is a bearing 9 for rotatably supporting a roller or wheel 10.

Supported transversely of the machine frame on the sills 1 and 2 are a pair of parallel cross bars or members 11 deflected downwardly at the center where each is provided with an opening to receive the apertured head 12 of an internally threaded sleeve 13. The head 12 is pivotally mounted on a pin 14 engaged through the apertured middle portion of a cross bar 11. Integrally formed on the lower portion of each head 12 is an abutment or stop 14ª which is adapted to contact a stop screw 15 adjustably engaged in a downwardly directed arm 16 formed on the bottom of the cross bar. The screw 15 is adapted to be locked in a set position by a lock nut 17. Formed at right angles on the rear of each sleeve 13 is an internally threaded arm 18 having a screw bolt 19 adjustably threaded therein and locked by a lock nut 20. When a sleeve 13 is thrown rearwardly as shown in dotted lines in Figure 4, the head of the screw bolt 19 is adapted to seat in a stop block 21 formed on the cross bar 11 for the purpose of limiting the rearward movement of the sleeve 13. Each sleeve 13 has threaded therein the lower end of a rod 22. Secured on the upper end of each rod 22 is a cross bar 23 having rings or sleeves 24 formed on the ends thereof. Connecting the upper cross bars 23 are two parallel tubes or pipes 25, the ends of which are engaged in the cross bar sleeves 24. A presser head plate 26 is rigidly secured to the bottom of the pipes 25 midway between the cross bars 23 by means of bolts 27 or other suitable means.

The squeeze and jolt mechanism of the molding machine comprises a squeeze cylinder 28 open at the top and made of cast iron or other suitable material. Integrally formed or rigidly secured horizontally across the front and rear of the squeeze cylinder 28 are mounting sleeves 29, which are engaged on the frame sills 1 and 2 to hold the squeeze cylinder secured in place. Also integrally formed on opposite sides of the exterior of the cylinder 28 are apertured arms or lugs 30. Slidably engaged in the cylinder 28 is a cylindrical squeeze piston 31 preferably made of cast aluminum to prevent rusting thereof. The squeeze piston is provided with a plurality of circumferential grooves within which packing rings 32 are seated to form a non-leaking fit between the cylinder 28 and the squeeze piston 31. A boss 33 is integrally formed on the bottom of the piston 31 and normally rests upon a boss 34 formed on the inner surface of the bottom of the cylinder 28. A chamber 35 is thus provided in the cylinder 28 below the squeeze piston 31. Formed axially within the squeeze piston 31 is a guide sleeve or cylinder 36 having an outlet port 37 near the lower end thereof. Integrally formed on the upper end of the guide sleeve 36 is a horizontal guide or spider plate 38 which extends diametrically across the top of the squeeze cylinder. The spider plate 38 is normally disposed in the plane of extension flanges or wing plates 39 integrally formed on the upper end of the cylinder 28 and opposite one another. A jolt table 40 is adapted to normally seat on the spider plate 38 and the cylinder flange 39. A plunger or stem 41 is integrally formed on the bottom surface of the jolt table and slidably projects downwardly into the piston guide sleeve 36. The plunger 41 is hollow and is provided with an opening 42 in the lower end thereof. A partition plate 43 integrally formed across the interior of the plunger 41 divides the interior thereof into an upper chamber 44 and a lower air chamber 45. An air intake or inlet port 46 is formed in the wall of the plunger below the partition plate 43. The plunger 41 is provided with external peripheral grooves in which packing rings 47 are engaged. Secured to the jolt table 40 are a pair of rods 48 which slidably project through the openings in the lugs 30 formed on the exterior of the squeezer cylinder 28. Nuts 49 are engaged on the lower ends of the rods 48 and serve as stops to limit the upward movement of the jolt table.

The air port 46 in the plunger 41 is normally adapted to register with a pipe nipple 50 which is threaded into an opening in the piston guide sleeve 36 as illustrated in Figure 7. Secured to the nipple 50 is one end of a flexible air supply pipe 51 which coils around the piston guide sleeve 36 and projects out over the top of the piston 31 and through an opening in the upper portion of the cylinder 28. The outer end of the flexible pipe 31 is connected by means of a nipple 52 with an outlet arm 53 of a jolter control valve casing 54. The jolter control valve casing 54 has a passaged externally threaded neck 55 at one end which is threaded into an opening in the rear of the pipe sill 1, as illustrated in Figure 6. The valve casing 54 is divided by a partition plate into inlet and outlet chambers 56 and 57 respectively. Formed in the partition plate is a valve seat 58, against which is normally seated a valve 59 held in place by a coiled spring 60 disposed within the valve inlet chamber 56. A valve stem 61 is secured to the valve 59 and projects outwardly through the valve outlet chamber 57, through the neck 55 and through the pipe sill 1. A knob or handle 62 is secured on the projecting end of the valve stem. Also formed on the valve casing 54 is an arm 63 which communicates with the valve intake chamber 56.

Also threaded into the rear of the pipe sill 1 is a shaker or vibrator control valve mechanism 64 similar in construction to the jolter valve mechanism shown in Figure 6. A valve stem handle or knob 65 is provided to permit operation of the valve mechanism 64. A hose or flexible pipe 66 connects the vibrator valve mechanism 64 with a pattern plate (not shown) but adapted to be used with a two part flask in making moulds. A pipe 67 connects the air intake arm 63 of the jolter valve mechanism with the air intake arm of the vibrator valve mechanism 64.

Connected to the connector pipe 67 by means of a three way connector 68 is an air supply or feed pipe 69 which is connected with any suitable source of compressed air. An inlet collar 70 and an outlet collar 71 are formed on one side near the bottom of the cylinder 28 and communicate with the cylinder chamber 35 below the piston 31. Connected to the air supply pipe 69 by a three way connector 72 is an elbow pipe 73 on the upturned end of which is mounted a main air control valve mechanism. The main air control valve mechanism embraces a supply valve casing 74 and an exhaust valve casing 75 rigidly connected to one another and having pivotally supported on the top thereof a control lever 76. A cross arm 77 is integrally formed at right angles on the lever 76 above the pivot point thereof. The lever cross arm 76 is provided with recesses in the bottom surface thereof to receive the upper ends of inlet and exhaust valve stems 78 and 79 respectively. The inlet valve stem 78 slidably projects downwardly into the valve casing 74 through an air outlet chamber 80 and has a valve 81 secured on the inner end thereof. The valve 81 is normally held seated by a spring 82 against a valve seat formed in a partition plate 83 which divides the casing 74 into an air intake chamber 84 and the air outlet chamber 80. Connected with the valve casing 74 to communicate with the air outlet chamber 80 is the upper end of a pipe 85, the other end of which is connected to the inlet collar 70 of the cylinder 28. The exhaust valve stem 79 projects into the exhaust valve casing 75 and has a valve 86 secured on the inner end thereof. The valve 86 is held by means of a coiled spring 87 seated against a valve seat formed in a partition plate 88 which divides the interior of the valve casing 75 into a lower intake chamber 89 and an upper exhaust chamber 90. An exhaust opening is provided in the valve casing 75 to permit escape of the air entering the exhaust chamber 90. A pipe 91 connects the lower end of the valve casing 75 with the outlet collar 71 of the cylinder 28.

The operation is as follows:

The machine frame uprights 4 are adapted to be adjusted with respect to the wheels 10 by means of pins which are removably engaged in the apertures of the axle collars 8 and the uprights 4. The wheels permit the molding machine to be moved forwardly over a pile or heap of molding sand thereby facilitating the work of forming moulds. As illustrated in Figure 2, the machine frame is so formed that it straddles the sand pile when in operation.

To form a mould, a mould or pattern plate to which the hose 66 is attached, is placed face up upon the jolt table 40. A lower flask frame or nowel is then placed on the pattern plate and filled with molding sand. The head plate 26 and its frame 22—25 is of course first thrown back into the dotted line position of Figure 4 with the heads of the bolts 19 resting against the stops 21 of the machine frame members 11.

To shake the sand down into the nowel so that all parts of the nowel will be properly filled with the molding sand the piston is released from its elevated position before the table 40 is jolted to settle the sand. This operation is accomplished by operating the jolter valve 59 in the valve casing 54 by means of the handle 62 and the valve stem 61. By pushing inwardly on the handle 62 the valve 59 is moved into open position against the action of the spring 60. Compressed air from the pipe 69 is thus permitted to flow through the pipe 67 and the valve casing 54 into the pipe 51 to enter the lower chamber 45 of the table plunger 41 by way of the air inlet port 46. The jolt table 40 and the plunger 41 are thus elevated with respect to the squeeze piston 31 until the lower end of the plunger starts to pass the air outlet port 37 in the piston guide sleeve 36. The air in the plunger chamber 45 is thus permitted to escape into the piston 31 thereby permitting the jolt table 40 to drop by gravity upon the spider plate 38 of the squeeze piston. This action jolts the nowel and causes the sand to pack upon the pattern plate. By repeated operations of the squeeze valve 81 and the jolter valve 59 the table 40 is properly elevated and jolted until the sand is sufficiently pressed into the nowel.

After the nowel is filled with sand the head plate frame 22—25 is pulled forwardly into the full line position of Figure 4 to position the head plate 26 above the filled nowel. The head plate frame 22—25 is prevented from swinging forwardly by the lugs 14ª which abut against the adjustable stop screws 15.

The lever 76 is now pulled forwardly, thereby causing the cross bar 77 to open the squeezer air inlet valve 81 against the action of the spring 82. Compressed air from the main supply or feed pipe 69 is thus permitted to flow through the valve casing chambers 84 and 80 and enter the cylinder chamber 35 by way of the pipe 85. Air entering the chamber 35 below the aluminum squeeze piston 31 causes said piston 31 to move upwardly in the cylinder 28 thereby raising the jolt table 40 and the mould forming members resting thereon. The nowel containing the sand is thus forced upwardly against the head plate 26 thereby pressing the sand into the nowel against the pattern on the pattern plate. By moving the lever 76 back into vertical position the squeezer air inlet valve 81 is closed by the spring 82 and the air in the cylinder 28 acts to hold the squeezer piston 31 in its elevated position.

For the purpose of lowering the jolt table 40 and the squeeze piston 31 into their normal position, the control lever 76 is swung rearwardly thereby opening the exhaust valve 86 to permit the air from the cylinder chamber 35 to escape by way of the pipe 91 and the open exhaust chamber 90 of the valve casing 75. The head plate and the frame 22—25 are again moved out of the way into the dotted line position of Figure 4. The shaker or vibrator valve in the valve casing 64 is now operated by means of the handle 65 thereby permitting the pattern plate below the nowel to be vibrated to cause loosening of the packed sand from the pattern on said pattern plate. The nowel is now removed from the jolt table 40 to permit the other half of the mould form to be made by means of the same or another pattern plate and the upper frame or cope of the two part flask.

After the two parts of the mould forms are made the cope and nowel are placed one upon the other and fastened together to permit moulten metal to be poured into the mould forms in the usual manner.

Attention is directed to the fact that the squeeze piston 31 and the jolt table 40 and its plunger 41 are preferably made of cast aluminum thereby obviating rusting. It will of course be understood that the operating parts of the squeeze and jolter mechanism may be made of other materials if desired. The frame parts of the machine may be made of angle irons or of steel piping as preferred.

I am aware that numerous details of construction may be varied through a wide range without departing from the principles of this invention, and I therefore do not purpose limiting the patent granted otherwise than necessitated by the prior art.

I claim as my invention:

1. A molding machine comprising a portable frame, wheels adjustably mounted thereon, a flask supporting mechanism movably mounted thereon, and a head plate supported on said frame for co-action with said flask supporting mechanism.

2. A molding machine comprising a main frame adapted to straddle a sand pile, wheels adjustably mounted on said main frame to permit the machine to be moved along over the sand pile, a squeeze and jolt mechanism supported on the main frame, valves for controlling the operation of said squeeze and jolt mechanism, an auxiliary frame adjustably supported on said main frame, and a head plate carried thereby for co-action with the squeeze and jolt mechanism.

3. A molding machine comprising a portable frame adapted to be moved along over a pile of molding sand, means for adjusting the height of said frame, an auxiliary frame pivotally supported on said portable frame, stops for limiting the swing of said auxiliary frame, a head plate on said auxiliary frame, and air controlled jolt and squeezer mechanisms on said portable frame adapted to co-act with said head plate to cause packing and pressing of sand into a flask carried by the machine.

4. The combination with a molding machine, of a cylinder forming a part thereof, a squeeze piston slidable in said cylinder, said cylinder having a chamber therein below the piston, an air inlet pipe connected with said cylinder chamber, an air inlet valve connected with said inlet pipe, an air exhaust pipe connected with said cylinder chamber, an air exhaust valve connected with said air exhaust pipe, a pivoted lever, a member integrally formed transversely thereon adapted to operate both of said air valves independently of one another to cause movement of said piston within said cylinder, an air supply pipe connected with said air inlet valve, a sleeve formed in said piston, said sleeve having an air exhaust port therein, a plunger slidable in said sleeve and having an air intake port therein, a pipe connected to said sleeve to furnish air into said plunger through said intake port, a jolt table formed on the upper end of said plunger, a jolter valve connected to the sleeve pipe and to said air supply pipe, and means for operating said jolt valve to cause jolting of said jolt table.

In testimony whereof I have hereunto subscribed my name in the presence of two subscribing witnesses.

WILLIAM H. DE VANEY.

Witnesses:
GEORGE DEIMLING,
Mrs. LILLIAN KRAPP.